Patented Oct. 10, 1944

2,360,309

UNITED STATES PATENT OFFICE 2,360,309

COMPOSITION OF MATTER AND METHOD OF PREPARATION

Richard F. B. Cox, Wilmington, Del., assignor to Hercules Powder Company, Wilmington, Del., a corporation of Delaware No Drawing. Application December 31, 1943, Serial No. 516,514

9 Claims. (Cl. 260—97)

This invention relates to a new composition of matter and to a method for its production. More particularly, it relates to a nitrosolactone of a resin acid and a method for production thereof.

Nitrosylchloride derivatives, nitrosates, and nitrosites of various resin and rosin acids have been produced in the art, but the products have in all cases been acids with no indication of the formation of a lactone. Nitrosolactones have never been detected.

Now in accordance with this invention it has been found that a nitrosolactone of a resin acid having the formula $C_{20}H_{31}O_3N$ may be produced by treating a dihydroabietic acid melting at 185°–186° C. with a nitrosating agent. Thus, by this method dihydroabietic acid melting at 185°–186° C. and formed from the lactone of hydroxytetrahydroabietic acid melting at 131°–132° C. may be treated with an anhydride of nitrous acid to produce a nitrosolactone of hydroxytetrahydroabietic acid which may then be separated from the reaction mixture.

Now having indicated in a general way the nature and purpose of the invention, the following examples are illustrative of the invention and the preferred embodiments thereof. All references to quantities are in terms of parts by weight unless otherwise mentioned.

Example 1

Three parts of dihydroabietic acid melting at 185°–186° C. and having a specific rotation $(a)_D$ of —36° (2% in alcohol) were dissolved in 50 parts of glacial acetic acid containing 1.8 parts of butyl nitrite. Then 50 parts of glacial acetic acid containing 2 parts of dry hydrogen chloride were added. After standing 2 hours at about 25° C., the solution became dark greenish blue in color. About 50 parts of water were added slowly to effect crystallization and the resulting light blue crystals, weighing 20 parts, were filtered out. These crystals melted at 88°–88.5° C. and were crystallized from a minimum amount of methanol at —70° C. to raise the melting point to 91.5°–92° C. The specific rotation $(a)_D$ was —920° (0.2% in alcohol); —925° (2% in alcohol). The nitrogen content calculated on the basis of the formula $C_{20}H_{31}O_3N$ for the nitrosolactone of hydroxytetrahydroabietic acid was 4.2% while 4.49% was found by analysis of the crystals themselves. Their chlorine content was nil.

Example 2

To a solution of three parts of dihydroabietic acid melting at 185°–186° C. and specific rotation $(a)_D$—36° in 50 parts of glacial acetic acid were added 1.8 parts of butyl nitrite and then 50 parts of glacial acetic acid containing 2 parts of concentrated nitric acid. After two hours at about 25° C., water was added to precipitate crystals which were recrystallized from methanol at —70° C. The final material melted at 91.5°–92° C. and had a specific rotation $(a)_D$ of —905° (2% in alcohol).

Example 3

Forty-two parts of a mixture of dihydroabietic acids, produced by the reaction of methyl magnesium iodide on the lactone of hydroxytetrahydroabietic acid, were dissolved in 300 parts of glacial acetic acid. The solution was cooled to 20° C. and to this solution were added 27 parts of butyl nitrite and 450 parts of glacial acetic acid containing 31 parts of hydrogen chloride. The mixture turned dark and then gradually greenish blue and crystals separated which were removed by filtration. The mother liquor was diluted cautiously with water to precipitate 16.3 parts of blue crystals of the nitrosolacetone of hydroxytetrahydroabietic acid melting at 91°–92° C.

Example 4

Three parts of dihydroabietic acid melting at 185°–186° C. and having a specific rotation $(a)_D$ of —36° were dissolved in 50 parts of glacial acetic acid containing 6.2 parts of an aqueous solution of sodium nitrite. The aqueous sodium nitrite solution was composed of 1.2 parts sodium nitrite and 5 parts water. Then 50 parts of glacial acetic acid containing two parts of dry hydrogen chloride were added. After standing 2 hours at about 25° C., the solution became dark greenish blue in color. About 50 parts of water were added slowly to effect crystallization and the resulting light blue crystals, weighing 20 parts, were filtered out. These crystals melted at 88°–88.5° C. and were recrystallized from a minimum amout of methanol at —70° C. to raise the melting point to 91.5°–92° C. The specific rotation $(a)_D$ was —920° (2% in alcohol); —925° (2% in alcohol). The nitrogen content calculated on the basis of the formula $C_{20}H_{31}O_3N$ for the nitrosolactone of hydroxytetrahydroabietic acid was 4.2% while 4.49% was found by analysis of the crystals themselves. Their chlorine content was nil.

Example 5

To a solution of three parts of dihydroabietic acid melting at 185°–186° C. and specific rotation $(\alpha)_D - 36°$ in 50 parts of glacial acetic acid were added 1.5 parts of nitrosyl chloride. After two hours at about 25° C., water was added to precipitate crystals which were recrystallized from methanol at −70° C. The final material melted at 91.5°–92° C. and had a specific rotation $(\alpha)_D$ of −905° (2% in alcohol).

*Example 6*

Forty-two parts of a mixture of dihydroabietic acids, produced by the reaction of methyl magnesium iodide on the lactone of hydroxytetrahydroabietic acid, were dissolved in 300 parts of glacial acetic acid. The solution was cooled to 20° C. and then 20 parts of ethyl nitrite and 450 parts of glacial acetic acid containing 31 parts of hydrogen chloride were added. The mixture turned dark and then gradually greenish blue and crystals separated which were removed by filtration. The mother liquor was diluted cautiously with water to precipitate 16.3 parts of blue crystals of the nitrosolactone of hydroxytetrahydroabietic acid melting at 91°–92° C.

The dihydroabietic acid used in this invention may be prepared by treating the lactone of hydroxytetrahydroabietic acid with a Grignard reagent. Purification may be accomplished by separating the mixture of dihydroabietic acids thus formed from the reaction product and obtaining the desired dihydroabietic acid by fractional crystallization. For example, the dihydroabietic acid melting at 185°–186° C. may be prepared by adding gradually 30.4 parts of the lactone of hydroxytetrahydroabietic acid melting at 131°–132° C. dissolved in 100 parts of dry benzene, to 16.6 parts of methyl magnesium iodide prepared by combining 15 parts of methyl iodide and 2.3 parts of magnesium in 50 parts of ether, and, when the addition is complete, heating the mixture for 5 hours at 80° to 100° C. and pouring the reaction product into 200 parts of ice water containing 25 parts of ammonium chloride. The benzene layer may then be extracted with 300 parts of 2% sodium hydroxide solution. This extract is composed of a mixture of the salts of two dihydroabietic acids, one of melting point 185°–186° C. and the other of melting point 147°–148° C. The mixture of acids may be recovered by acidification and separation from the mother liquor by filtration or other means for separating solids from liquids. The dihydroabietic acid useful in this invention melts at 185°–186° C., has a specific rotation $(\alpha)_D$ of −36° when in 2% solution in alcohol. It may be further separated from the mixture of dihydroabietic acids by fractional crystallization from a solvent such as ethyl acetate from which the desired acid crystallizes in the form of fine needles. The dihydroabietic acid of melting point 185°–186° C. useful in the process may be used in its purified form or in its admixture with the dihydroabietic acid of melting point 147°–148° C., the latter acid not forming a nitrosolactone. Although the above described method for the preparation of the dihydroabietic acid melting at 185°–186° C. is a convenient one, the usefulness of this acid in the present invention is not dependent upon any one specific method of preparation.

The reaction of dihydroabietic acid melting at 185°–186° C. with the nitrosating agent may be carried out in any inert solvent. By inert solvent is meant one which will dissolve the reactants and which will not react preferentially either with the nitrosating agent to form an inactive compound or with the nitrosolactone of dihydroabietic acid produced by the reaction. Such solvents as acetic acid, dioxane, ether, ethanol, butanol and the like may be used. Glacial acetic acid is a preferred solvent for the reaction. The reaction may also be carried out under conditions where one of the reactants serves as the solvent. For example, in cases where nitrosyl chloride is generated in situ from butyl nitrite and an acid, butyl nitrite may act as the reaction solvent.

The nitrosating agent may be an anhydride of nitrous acid or other oxides of nitrogen such as nitrogen tetroxide, nitrogen trioxide, and the like, or may be a mixed anhydride of nitrous acid and another acid such as nitrosyl chloride, nitrosyl bromide, nitrosyl nitrate, nitrosyl sulfuric acid, nitrosyl acetate, and the like, and may be added as a gas or liquid or produced in situ from materials such as ethyl nitrite, butyl nitrite, amyl nitrite, sodium nitrite, potassium nitrite and the like, through reaction with nitric acid, hydrogen chloride, hydrogen bromide, sulfuric acid, and the like. Preferably, the nitrosating of the dihydroabietic acid will be carried out by the addition of dry hydrogen chloride in an inert solvent to a solution of the dihydroabietic acid in an inert solvent containing butyl nitrite.

The temperature of the reaction may vary from about −20° to about 60° C., but preferably will be from about 0° to about 30° C. The temperature in any case should not be so low as to freeze the solvent, thus preventing adequate mixing of the ingredients.

The reaction time may be from about ¼ hour to about 4 hours, but more preferably from about 1 hour to about 2 hours.

The blue nitrosolactone of the hydroxytetrahydroabietic acid may be recovered from the reaction mixture by adding water to the reaction mixture followed by filtration, centrifugation or other means of separating the crystals of blue nitrosolactone of hydroxytetrahydroabietic acid from the mother liquor. Alternatively, the conditions of the reaction, such as concentrations of the reactants, may be so adjusted that the crystals of the blue nitrosolactone form spontaneously without the addition of water.

The nitrosolactone of hydroxytetrahydroabietic acid produced according to this invention is blue in color, melts at 91.5° to 92° C., and has an unusually high specific rotation of $(\alpha)_D - 925°$ when dissolved to the extent of 2% in ethyl alcohol. It crystallizes in the form of a blue powder and on standing is gradually converted to another nitrosolactone of the same empirical formula $C_{20}H_{31}O_3N$, which is colorless, is insoluble in ethyl alcohol and which melts at 136°–137° C., and has an optical rotation $(\alpha)_D$ of +18° when dissolved to the extent of 2% in chloroform. The analytical data calculated for $C_{20}H_{31}O_3N$ is C, 72.06; H, 9.36; N, 4.2 and analysis of the colorless nitrosolactone of hydroxytetrahydroabietic acid of melting point 136°–137° C. revealed it to have a composition of C, 69.4; H, 9.33; N, 4.12. Both the blue and the colorless nitrosolactone of hydroxytetrahydroabietic acid may be converted to the same aminolactone by reduction.

The two nitrosolactones of hydroxytetrahydroabietic acid produced in accordance with this invention are valuable starting materials for syntheses, particularly for the synthesis of hydrophenanthrene type compounds.

What I claim and desire to protect by Letters Patent is:

1. As a new composition of matter a nitrosolactone of a resin acid having the formula $C_{20}H_{31}O_3N$.

2. As a new composition of matter a nitrosolactone of hydroxytetrahydroabietic acid.

3. As a new composition of matter the nitrosolactone of hydroxytetrahydroabietic acid melting at 91.5°–92° C. and having a specific rotation $(\alpha)_D$ of −925° when in 2% solution of ethyl alcohol.

4. As a new composition of matter the nitrosolactone of hydroxytetrahydroabietic acid melting at 136°–137° C. and having a specific rotation $(\alpha)_D$ of +18° when in 2% solution in choloroform.

5. A process for producing a nitrosolactone of a resin acid having the formula $C_{20}H_{31}O_3N$ which comprises treating dihydroabietic acid melting at 185°–186° C. with a nitrosating agent.

6. A process for producing a nitrosolactone of hydroxytetrahydroabietic acid which comprises treating dihydroabietic acid melting at 185°–186° C. with an anhydride of nitrous acid.

7. A process for producing a nitrosolactone of hydroxytetrahydroabietic acid which comprises treating dihydroabietic acid melting at 185°–186° C. with a mixed anhydride formed from nitrous acid and another and different acid.

8. A process for producing the nitrosolactone of hydroxytetrahydroabietic acid melting at 91.5°–92° C. which comprises treating dihydroabietic acid melting at 185°–186° C. with butyl nitrite and dry hydrogen chloride under conditions which favor the addition of the nitrosyl derivative to the double bond.

9. A process for producing the nitrosolactone of hydroxytetrahydroabietic acid melting at 91.5°–92° C. which comprises treating dihydroabietic acid melting at 185°–186° C. with butyl nitrite and dry hydrogen chloride under conditions which favor the addition of the nitrosyl derivative to the double bond and separating the nitrosolactone of hydroxytetrahydroabietic acid from the reaction mixture.

RICHARD F. B. COX.